United States Patent [19]

Jacquet

[11] Patent Number: 4,629,104
[45] Date of Patent: Dec. 16, 1986

[54] BICYCLE RACK DESIGNED FOR ATTACHMENT TO THE LUGGAGE CARRIER OF A VEHICLE

[75] Inventor: Bernard A. Jacquet, Lyon 1er, France

[73] Assignee: Societe d'Exploitation des Establissements Macroex, France

[21] Appl. No.: 646,437

[22] Filed: Sep. 4, 1984

[30] Foreign Application Priority Data

Sep. 12, 1983 [FR] France ............... 83 14814

[51] Int. Cl.⁴ .............................. B60R 9/00
[52] U.S. Cl. ...................... 224/324; 224/315; 224/42.03 B; 211/17; 211/20
[58] Field of Search ........ 211/17, 18, 22, 20; 224/324, 42.03 B, 309, 315, 322, 323, 30 A, 30 R; 269/228

[56] References Cited

U.S. PATENT DOCUMENTS

| 764,774 | 7/1904 | Sargeant | 211/18 |
| 2,415,286 | 2/1947 | Hyde | 224/42.03 B |
| 3,514,091 | 5/1970 | Johnson et al. | 269/228 |
| 3,947,010 | 3/1976 | Zeller | 211/17 |

FOREIGN PATENT DOCUMENTS 2621683 12/1977 Fed. Rep. of Germany ...... 224/324
2470029 6/1981 France ............... 224/30 A Primary Examiner—Stephen Marcus
Assistant Examiner—David Voorhees
Attorney, Agent, or Firm—Remy J. VanOphem

[57] ABSTRACT

A bicycle rack for holding a bicycle in an upright position and designed to be attached to the luggage carrier on a motor vehicle. The rack includes a frame bracket with a jaw with an upwardly facing jaw which receives the crank assembly housing of the bicycle. The jaw preferably includes a fixed member and a movable member which moves arcuately with respect to the fixed member from an open position, to permit the bicycle crank assembly housing to be placed therein to a closed position which secures the housing from removal. A lever can be provided for such a multi-member jaw to facilitate the opening and closing thereof, and a lock may be incorporated into this lever to make the rack resistant to the theft of a bicycle therefrom and to prevent the accidental opening of the jaw during the transportation of a bicycle. A cradle can be utilized in conjunction to secure the bicycle at another location, for example at one of the wheels thereof, for a secure two-point holding of the bicycle, and such a cradle and frame bracket can be integrated by mounting them on a common longitudinal mounting bar.

5 Claims, 5 Drawing Figures

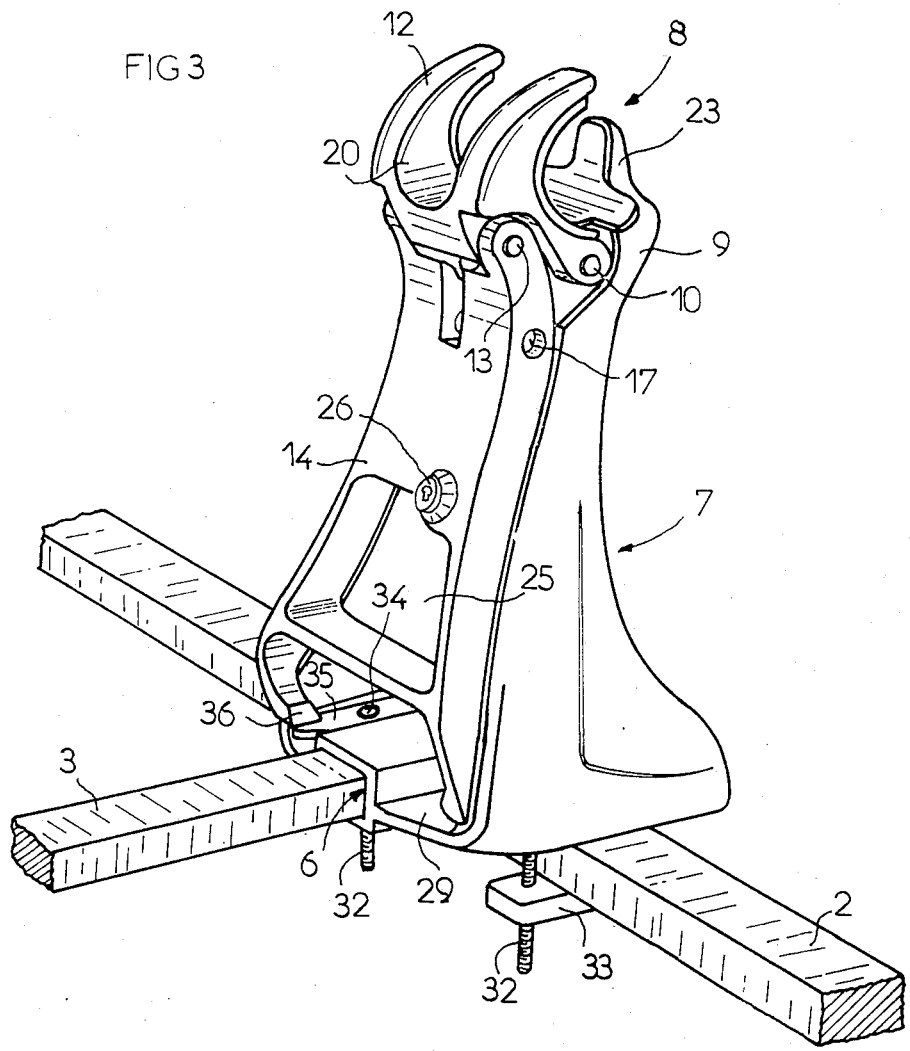

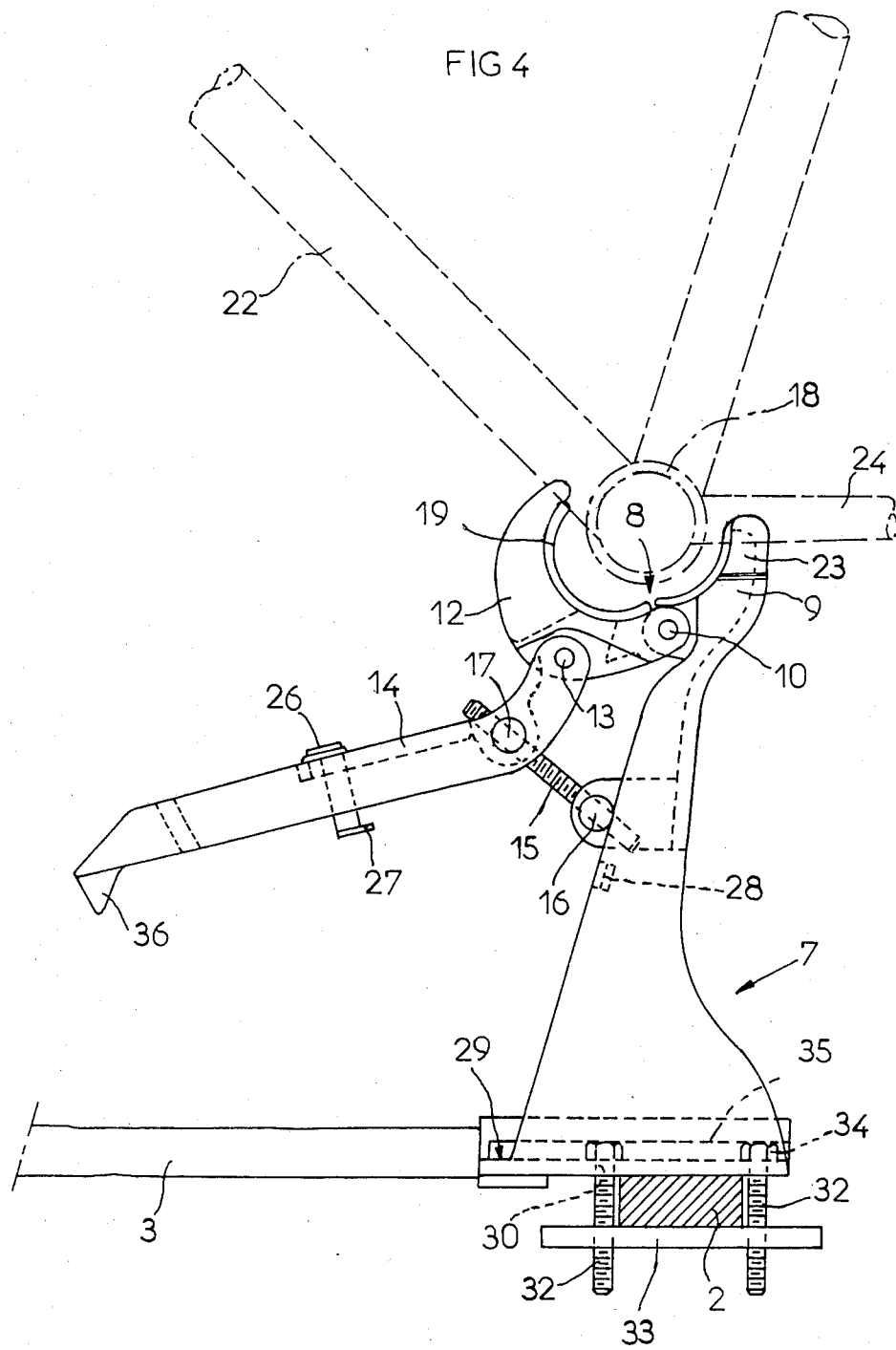

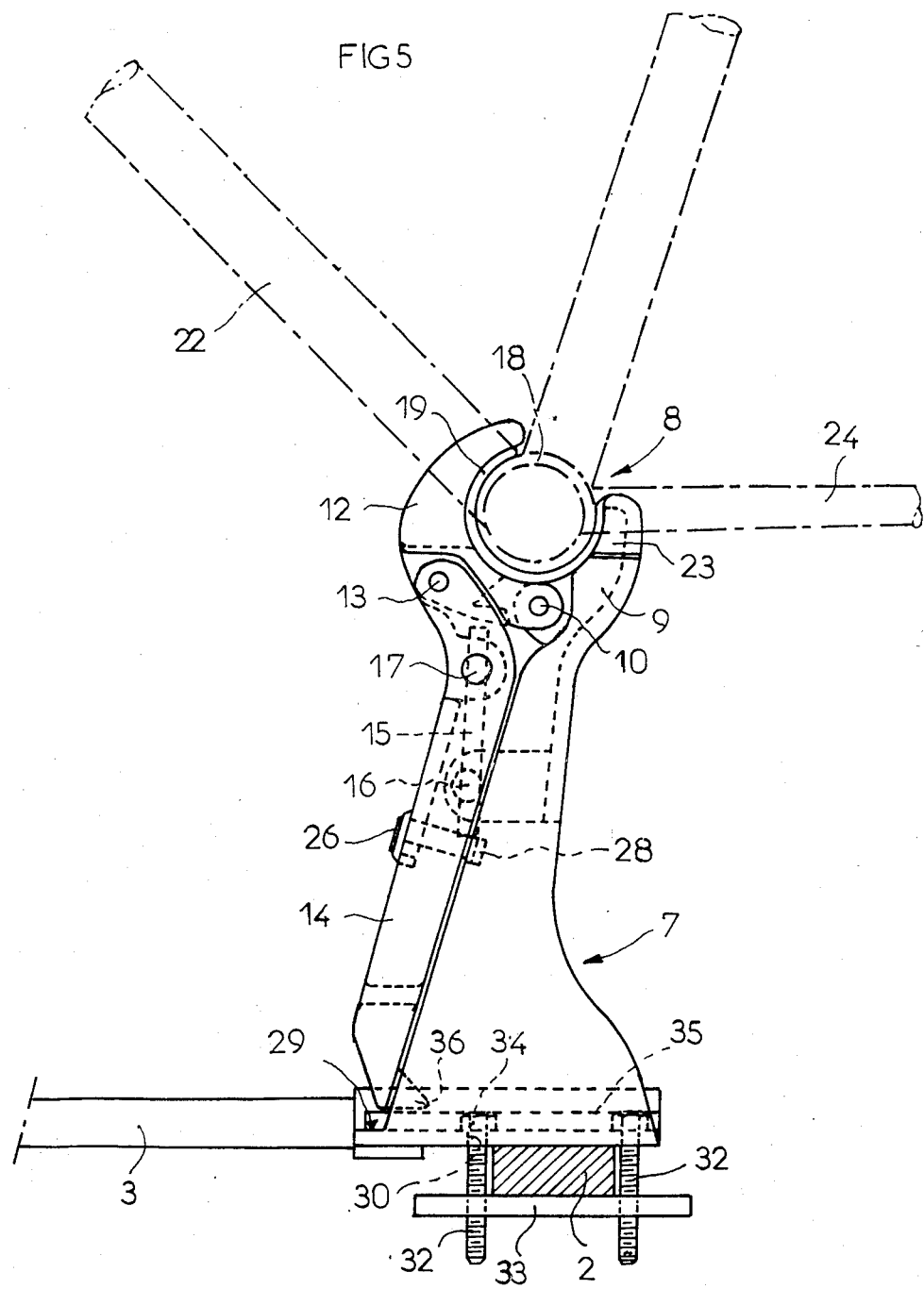

BICYCLE RACK DESIGNED FOR ATTACHMENT TO THE LUGGAGE CARRIER OF A VEHICLE

BACKGROUND OF THE INVENTION

The present invention pertains to a rack designed to hold a bicycle on the roof of a car. More particularly, the present invention pertains to a bicycle rack which is adapted to be attached to a luggage carrier on the roof of a motor vehicle and which holds a bicycle in an upright position.

A bicycle rack of the present invention consists of a cradle which is used to lock the front wheel of the bicycle in position, and it also includes a bracket which clamps the pedal crank assembly. The bracket includes a hinged lever which may be locked in its closed position to help prevent the theft of the bicycle.

The safest and most convenient way to set a bicycle on the roof of a vehicle usually consists of a bicycle rack attached to the roof or trunk luggage carrier, depending on the type of vehicle considered.

Two categories of bicycle racks are presently used, namely those that hold the bicycle in an upside-down position and those allowing for an upright position of the bicycle.

When a bicycle is mounted in a rack in an upside down position, it is held by the handlebar and the saddle. However, in a rack of this type which is secure in that it does not permit the bicycle to break loose, damage to the bicycle may result, due to the stress applied thereto by the vehicle's vibrations, as well as the significant overhang with respect to the mounting points.

The upright bicycle racks do not have that disadvantage, since the bicycle is held by the saddle mounting tube, close to the saddle, and by the front wheel or the front fork. Prior art upright racks, however, required the use of a large jib for the fastening of the saddle tube, and, therefore, are cumbersome, unaesthetic and inconvenient to the user during bicycle fastening and unfastening operations.

SUMMARY OF THE INVENTION

The present invention eliminates the above disadvantages of the upright bicycle rack in the following manner.

A bicycle rack according to the present invention wherein the bicycle is fastened in an upright position, includes a longitudinal bar equipped with a cradle in which the front wheel rests, and a frame bracket. The frame bracket includes an upper portion shaped as a jaw opening upward which, when closed, defines a cylindrical area spread at an angle greater than 180° which is designed to clamp the pedal crank assembly of the bicycle.

Since the lower portion of the bicycle is fastened to the bracket, the latter is, therefore, easily accessible to the user.

Furthermore, the fastening of the pedal crank assembly is more desirable since the bicycle is fastened at its point of greatest resistance, that is, the junction of the lower frame tube of the saddle tube and the two lower rear wheel mounting tubes and is, therefore, more resistant to damage from impacts and vibrations.

From a practical point of view, it is easy to position the bicycle over the rack. As the jaw is open, the bicycle is set with the pedal crank assembly housing resting inside the jaw and the front wheel resting in its cradle. The only operation then required to be performed by the user consists of closing the jaw. As the jaws are closed, they clamp the pedal crank assembly housing without causing any damage, even superficial, to the latter, since the jaws are covered with an appropriate material such as a synthetic material.

In order to provide for a perfect fastening of the bicycle pedal crank assembly, that portion of the jaw which is located in front of the bicycle includes a centrally located recess, while the portion located at the rear of the bicycle features two lateral recesses.

The centrally located recess allows enough space to permit the lower tube of the frame to pass therethrough, and the lateral recesses are adequately dimensioned to let the pedal crank mounted tubes used for the mounting of the rear wheel to pass therethrough.

In a preferred embodiment of the bicycle rack, the jaw consists of two cylindrical members hingedly connected together around an axis parallel with that of the cylindrical surface defined by the members. One of these members remains fixed and is rigidly mounted with the bracket, while the other, is movable with respect to the fixed member, with its movement being controlled by a lever. The control lever is hinged onto the movable jaw member, as well as onto the bracket, and the pivoting axes of the lever are parallel with that of the cylindrical surface. Movement of the lever, therefore, controls the opening and closing operations of the jaw.

The mounting of the lever onto the bracket may be obtained by means of a double pivot arrangement utilizing a connecting rod of adjustable length.

The end joints of this rod define, with the joints of both jaw members hinged one onto another, with the lever hinge on one of the jaw members, a trapezium which causes the jaw to be tightened as the lever comes to rest against the bracket.

Modifying the length of the connecting rod between the bracket and the lever enables the user to vary the "squeeze" of the jaw and, thus, accurately adapt it to the size of the pedal crank assembly of the bicycle to be transported.

In the preferred embodiment the lever is equipped with a lock that includes a latch designed to be engaged in a catch provided in the bracket, as the lever is brought to the closed position.

This arrangement provides both an antitheft lock for the bicycle when the vehicle is stopped, and helps to prevent any undesirable opening of the lever as the vehicle, to which the bicycle rack is attached, is running.

According to another feature of the invention, the bicycle rack includes a bracket which is attached to one of the bars of the luggage rack by two sets of screws. Both screws of each set are located on either side of the bar and tightened onto a single plate resting underneath the bar.

Additionally, the bracket includes an aperture allowing for the passage of a plate shaped member which rests underneath the bar. The member includes four holes provided for the passage of the screws, the heads in each pair of screws being coupled with a cover plate which prevents any tampering with the screw heads once it is set in place. The lever is also designed and dimensioned to rest against the screw head's cover plate, so that the screws cannot be removed when the lever is in a locked position.

The lever lock thus prevents both the opening of the jaw and the removal of the jaw's bracket from the luggage rack, which increases the bicycle mount theft protection.

The attached drawings illustrate a preferred embodiment of the present invention, but it is not intended to limit the invention by the drawings.

BRIEF DESCRIPTION OF THE DRAWINGS

FIG. 3 is a perspective view of the frame bracket portion of the rack of FIG. 1; and FIGS. 4 and 5 are two side views of the bracket portion of the rack illustrated in FIG. 1, respectively showing the bracket with an open and closed jaw.

DETAILED DESCRIPTION OF THE PREFERRED EMBODIMENT

Figure 1:
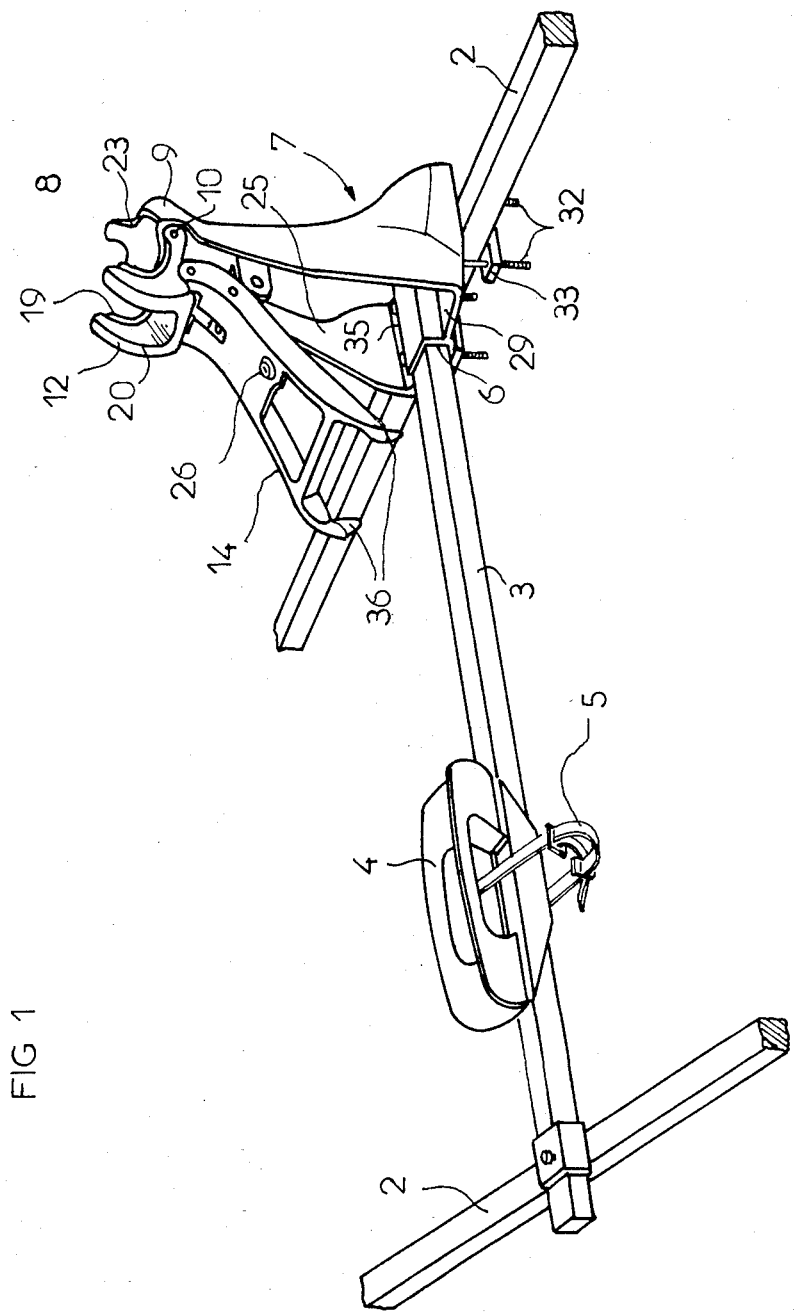
FIG. 1 is a perspective view of the bicycle rack.
Figure 2:
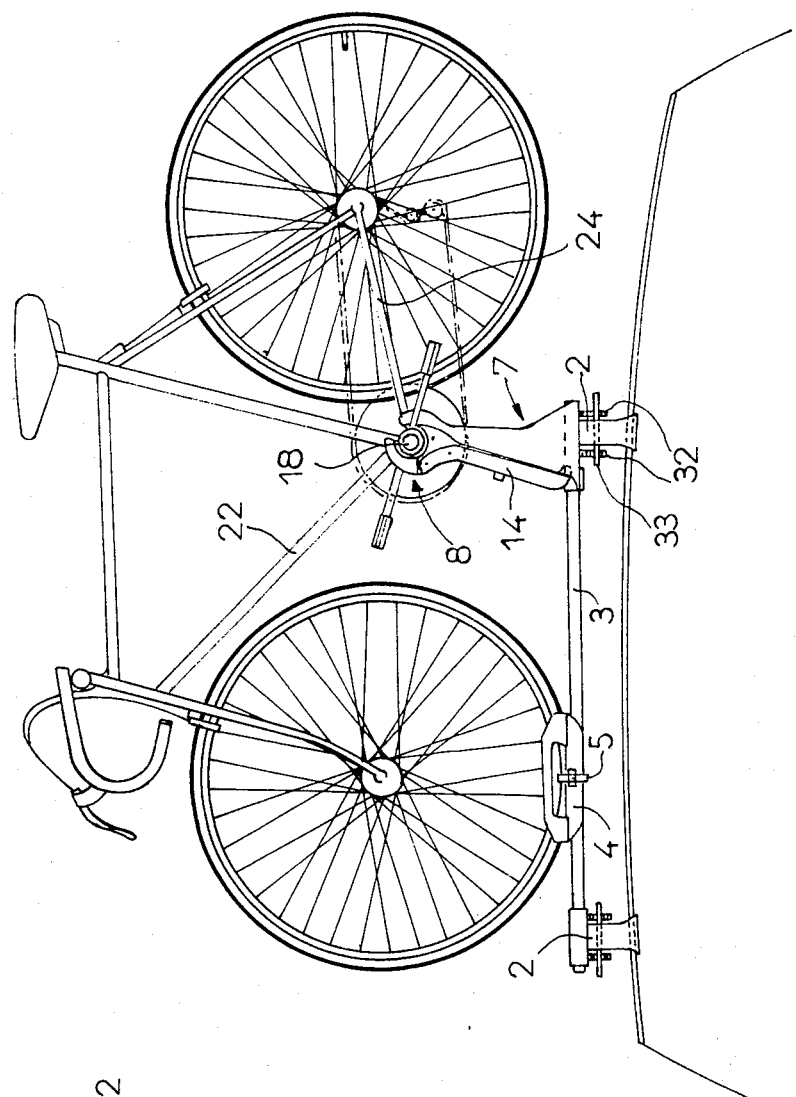
FIG. 2 is a side view showing the rack of FIG. 1 on a vehicle with a bicycle in a transporting position in the rack.

The bicycle rack illustrated in the drawings is designed to be mounted on the two bars of a motor vehicle luggage rack. As is shown in FIGS. 1 and 2, this bicycle rack includes a longitudinal bar 3 spanning both bars 2 of the luggage rack. The longitudinal bar 3 carries a cradle 4 designed to receive the bicycle's front wheel, and the wheel is secured within the cradle by means of a strap 5.

One end of the longitudinal bar 3 is engaged into a recess 6 provided in a bicycle frame bracket 7 mounted onto one of the two bars 2 of the luggage rack.

The frame bracket 7, which extends vertically upwardly from the bar 2 to which it is attached, includes an upper end shaped as a jaw 8 which defines a cylindrical surface spreading over an angle which exceeds 180° in closed position. The jaw 8 includes a fixed member 9, rigidly mounted with the frame bracket 7. A second member 12 is hinged with respect to the fixed member 9 around a pin 10 which is parallel with the axis of the cylindrical surface. A lever 14, hinged around a pin 13 which is parallel with the pin 10, is hingedly attached to the second member 12. The lever 14 is attached to the frame bracket 7 by means of a rod 15. One end of the rod 15 is hingedly attached to the frame bracket 7 at a pin 17 and the other end is hingedly attached to the lever 14 at a pin 16, with the pins 16 and 17 being parallel to the pins 10 and 13.

The rod 15 is threaded and engaged into the threaded bores of the pins 16 and 17 so as to allow for the adjustment of the spacing between the pins 16 and 17.

The opening and closing operations of the jaw 8 are obtained by activating the lever 14 and the deformation of the trapezium defined by the pins 10, 13,16, and 17. As illustrated in FIG. 4, when the lever 14 is moved away from the frame bracket 7, the jaw is open, thus allowing for the passage of a bicycle's pedal crank assembly housing 18. After the pedal crank assembly housing has come to rest in the jaw 8, the pivoting of the lever 14 to the position illustrated in FIG. 5 causes the jaw to close and lock the pedal crank assembly. In order to prevent any damage to the latter, the jaw may be covered with a soft material 19 made from synthetic products.

As shown in FIG. 3, the second member 12 of the jaw 8, that is the one located toward the front of the bicycle in the arrangement illustrated in FIG. 2, includes a central recess 20 to permit a lower tube 22 of the bicycle frame to pass therethrough.

The fixed member 9 of the jaw includes two spaced apart recesses 23 to permit rear wheel mounting tubes 24 of the bicycle to pass therethrough.

As illustrated in the drawings, particularly in FIG. 1, the frame bracket 7 includes a central aperture 25. This aperture allows for the mounting of a lock 26 on the lever 14. This lock consists of a latch 27 which protrudes from the central aperture 25 when the lever is in a locked position, and can be engaged into a catch 28 provided in the frame bracket 7. Furthermore, the central aperture 25 of the frame bracket 7 provides access to, a plate 29 which rests on the bar 2. This plate has four holes 30 allowing for the passage of two pairs of screws 32. As shown in the drawing, the screws 32 of the same pair are located on either side of the bar 2 and are fastened into a single plate 33 resting underneath the above mentioned bar. The heads 34 of each pair of screws 32 are covered with a plate 35 which prevents any tampering with the screws. Furthermore, as indicated in FIGS. 1 and 3 through 5 of the drawings, the free end of the lever 14 is shaped in such a way as to include two flanges 36 which come to rest against the plates 35 when the lever is in a closed position. Therefore, when the lever is in a locked position, the plates 35 cannot be disassembled and the screws 32 cannot be removed.

As discussed hereabove, the invention brings a significant improvement to the existing technology by offering a compact, easy to use bicycle rack which also provides an excellent grip of the bicycle without damaging the latter, since the main component of the bicycle rack holds the pedal crank assembly which is one of the sturdiest parts of the bicycle.

Obviously, the invention is not limited to a single construction of the above described bicycle rack, but includes all construction variations. Consequently, it will be appreciated by those skilled in the art that many modifications and variations are possible to the article described above within the scope of the present invention. Such modifications and variations are within the intended scope of the claims appended hereto.

What is claimed is:

1. In combination with a bicycle of the type having a front and rear wheel, a frame and a pedal crank assembly housing being a portion of said frame, and a bicycle rack for holding said bicycle in an upright position, the improvement comprising:
    a longitudinal bar;
    a cradle attached to said longitudinal bar and adapted to receive said front wheel of said bicycle; and
    a frame bracket attached to said longitudinal bar and adapted to receive said pedal crank assembly housing of said bicycle, said frame bracket comprising a jaw with a generally upwardly facing curved surface, said upwardly facing curved surface being the portion of said frame bracket which is adapted to receive said pedal crank assembly housing of said bicycle, said jaw comprising:
    a first member with a first arcuate surface and a second member with a second arcuate surface, said first and second members being hingedly connected to move between an open position in which said pedal crank assembly housing of said bicycle can be inserted in said jaw and a closed position in which said pedal crank assembly housing of said bicycle can be grasped by said jaw;

a lever hingedly connected to said first member at a first axis and hingedly connected to said second member at a second axis, said second axis being parallel to said first axis, said lever being movable to move said second member with respect to said first member between said open position and said closed position;

a connecting rod of adjustable length for connecting said lever to said first member, said connecting rod being hingedly connected to said first member to said first axis and being hingedly connected to said lever at a third axis, said third axis being parallel to said first axis;

means for adjusting said connecting rod, said means for adjusting said connecting rod being effective to vary the degree of closing of said second member with respect to said first member;

a luggage carrier having a bar;

two pairs of screws adapted to secure said frame bracket to said bar of said luggage carrier, said frame bracket further comprising a bottom member adapted to be positioned above said bar, said bottom member comprising holes to permit said screws to pass therethrough, said screws of each pair of screws being adapted to be positioned on opposite sides of said bar;

first plate means adapted to be positioned under said bar to receive said screws;

second plate means adapted to be positioned above said bar, said second plate means comprising holes for receiving the heads of said screws; and said lever resting on said second plate means when it has been moved to said closed position with respect to said first member to prevent loosening of said screws when said lever is in said closed position.

2. The combination as claimed in claim 1 further comprising a lock attached to said lever, said lock comprising movable means carried by said lock, and means carried by said frame bracket to receive said movable means of said lock when said lever has been moved to a position corresponding to said closed position of said second member.

3. In combination with a bicycle of the type having a front and rear wheel, a frame and a pedal crank assembly housing being a portion of said frame, and a bicycle rack for holding said bicycle in an upright position, the improvement comprising:

a longitudinal bar;

a cradle attached to said longitudinal bar and adapted to receive said front wheel of said bicycle; and a frame bracket attached to said longitudinal bar and adapted to receive said pedal crank assembly housing of said bicycle, said frame bracket comprising a jaw with a generally upwardly facing curved surface, said upwardly facing curved surface being the portion of said frame bracket which is adapted to receive said pedal crank assembly housing of said bicycle, said jaw comprising:

a first member with a first arcuate surface and a second member with a second arcuate surface, said first and second members being hingedly connected to move between an open position in which said pedal crank assembly housing of said bicycle can be inserted in said jaw and a closed position in which said pedal crank assembly housing of said bicycle can be grasped by said jaw;

a lever hingedly connected to said first member at a first axis and hingedly connected to said second member at a second axis, said second axis being parallel to said first axis, said lever being movable to move said second member with respect to said first member between said open position and said closed position;

a luggage carrier having a bar;

two pairs of screws adapted to secure said frame bracket to said bar of said luggage carrier, said frame bracket further comprising a bottom member adapted to be positioned above said bar, said bottom member comprising holes to permit said screws to pass therethrough, said screws of each pair of screws being adapted to be positioned on opposite sides of said bar;

first plate means adapted to be positioned under said bar to receive said screws;

second plate means adapted to be positioned above said bar, said second plate means comprising holes for receiving the heads of said screws; and said lever resting on said second plate means when it has been moved to said closed position with respect to said first member to prevent loosening of said screws when said lever is in said closed position.

4. The combination as claimed in claim 3 wherein said frame bracket further comprises a central recess to permit the lower tube of said bicycle to pass therethrough.

5. The combination as claimed in claims 3 or 4 wherein said frame bracket further comprises a pair of spaced apart side recesses to permit the rear wheel mounting tubes of said bicycle to pass therethrough.

* * * * *

UNITED STATES PATENT AND TRADEMARK OFFICE
CERTIFICATE OF CORRECTION

PATENT NO. : 4,629,104
DATED : December 16, 1986
INVENTOR(S) : Bernard Jacquet

It is certified that error appears in the above-identified patent and that said Letters Patent is hereby corrected as shown below:

On the title page the Assignee should read

-- Societe d'Exploitation des Etablissements Macorex, France --.

Signed and Sealed this

Twenty-eighth Day of April, 1987

Attest:

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,629,104
DATED : December 16, 1986
INVENTOR(S) : Bernard Jacquet

It is certified that error appears in the above-identified patent and that said Letters Patent is hereby corrected as shown below:

Column 2, line 1, delete "jaw" and insert -- jaws --.

Column 2, line 34,, before "with" insert -- and --.

Signed and Sealed this

Eighteenth Day of August, 1987

*Attest:*

DONALD J. QUIGG

*Attesting Officer*  *Commissioner of Patents and Trademarks*